United States Patent
Hsu

(10) Patent No.: US 12,013,738 B2
(45) Date of Patent: *Jun. 18, 2024

(54) SENSOR ARRAY AND METHOD OF CONTROLLING SENSING DEVICE AND RELATED ELECTRONIC DEVICE

(71) Applicant: PixArt Imaging Inc., Hsin-Chu (TW)

(72) Inventor: En-Feng Hsu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 130 days.

This patent is subject to a terminal disclaimer.

(21) Appl. No.: 17/222,987

(22) Filed: Apr. 5, 2021

(65) Prior Publication Data

US 2021/0223849 A1    Jul. 22, 2021

Related U.S. Application Data

(63) Continuation of application No. 16/593,930, filed on Oct. 4, 2019, now Pat. No. 11,003,234, which is a (Continued)

(30) Foreign Application Priority Data

Nov. 6, 2012 (TW) ................................ 101141137

(51) Int. Cl.
*G06F 1/3231* (2019.01)
*G06F 1/3234* (2019.01)
(Continued)

(52) U.S. Cl.
CPC .......... *G06F 1/3231* (2013.01); *G06F 1/3262* (2013.01); *G06F 1/3287* (2013.01);
(Continued)

(58) Field of Classification Search
CPC .... G06F 1/3231; G06F 1/3262; G06F 1/3287; G06F 3/017; G06F 3/0304; Y02D 10/00
See application file for complete search history.

(56) References Cited

U.S. PATENT DOCUMENTS

| 6,677,979 B1 | 1/2004 | Westfield |
| 7,925,051 B2 | 4/2011 | Gensolen |

(Continued)

FOREIGN PATENT DOCUMENTS

| CN | 102253709 A | 11/2011 |
| CN | 102455823 A | 5/2012 |

(Continued)

OTHER PUBLICATIONS

Wong ("How Microsoft's PrimeSense-based Kinect Really Works", Electric Design, Mar. 16, 2011) (Year: 2011).*

*Primary Examiner* — Jennifer D Bennett
(74) *Attorney, Agent, or Firm* — Winston Hsu

(57) ABSTRACT

An electronic device includes: a first sensing device, for selectively detecting a state of motion of an object at a first frequency; a second sensing device for selectively detecting the object to determine whether the object is in a specific space at a second frequency, wherein the second frequency is different from the first frequency; a light emitting device, for illuminating the object to make the first sensing device able to detect the state of motion of the object; and a control unit, coupled to the first sensing device and the second sensing device, for controlling operating states of the first sensing device and the second sensing device.

12 Claims, 7 Drawing Sheets

Related U.S. Application Data continuation of application No. 14/055,894, filed on Oct. 17, 2013, now Pat. No. 10,481,670.

(51) Int. Cl.
  *G06F 1/3287* (2019.01)
  *G06F 3/01* (2006.01)
  *G06F 3/03* (2006.01)

(52) U.S. Cl.
  CPC ............ *G06F 3/017* (2013.01); *G06F 3/0304* (2013.01); *Y02D 10/00* (2018.01)

(56) References Cited

U.S. PATENT DOCUMENTS

| | | | |
|---|---|---|---|
| 10,481,670 B2 | | 11/2019 | Hsu |
| 11,003,234 B2* | | 5/2021 | Hsu ...................... G06F 1/3287 |
| 2002/0030668 A1 | | 3/2002 | Hoshino |
| 2004/0212677 A1 | | 10/2004 | Uebbing |
| 2005/0285966 A1* | | 12/2005 | Bamji ..................... G01C 3/08 |
| | | | 348/E9.005 |
| 2008/0167834 A1 | | 7/2008 | Herz |
| 2008/0211941 A1 | | 9/2008 | Deever |
| 2009/0009195 A1 | | 1/2009 | Seguine |
| 2010/0313050 A1 | | 12/2010 | Harrat |
| 2011/0069189 A1 | | 3/2011 | Venkataraman |
| 2011/0134251 A1 | | 6/2011 | Kim |
| 2011/0248152 A1 | | 10/2011 | Svajda |
| 2011/0298967 A1 | | 12/2011 | Clavin |
| 2012/0018637 A1 | | 1/2012 | Mitani |
| 2012/0127124 A1 | | 5/2012 | Zanone |
| 2012/0188389 A1 | | 7/2012 | Lin |
| 2012/0327218 A1 | | 12/2012 | Baker |
| 2013/0229491 A1 | | 9/2013 | Kim |
| 2013/0265396 A1* | | 10/2013 | Surma ...................... G06T 7/70 |
| | | | 348/47 |
| 2013/0293752 A1 | | 11/2013 | Peng |
| 2014/0009648 A1 | | 1/2014 | Kim |
| 2014/0168372 A1 | | 6/2014 | Chang |
| 2016/0026255 A1 | | 1/2016 | Katz |

FOREIGN PATENT DOCUMENTS

| | | |
|---|---|---|
| CN | 102520794 A | 6/2012 |
| CN | 102640081 A | 8/2012 |
| TW | M406689 U1 | 7/2011 |
| TW | 201133301 | 10/2011 |
| TW | M418251 U1 | 12/2011 |
| TW | 201204061 | 1/2012 |
| TW | I357582 | 2/2012 |
| TW | 201239780 | 10/2012 |
| TW | 201241700 | 10/2012 |
| WO | 2011/113800 A1 | 9/2011 |

\* cited by examiner

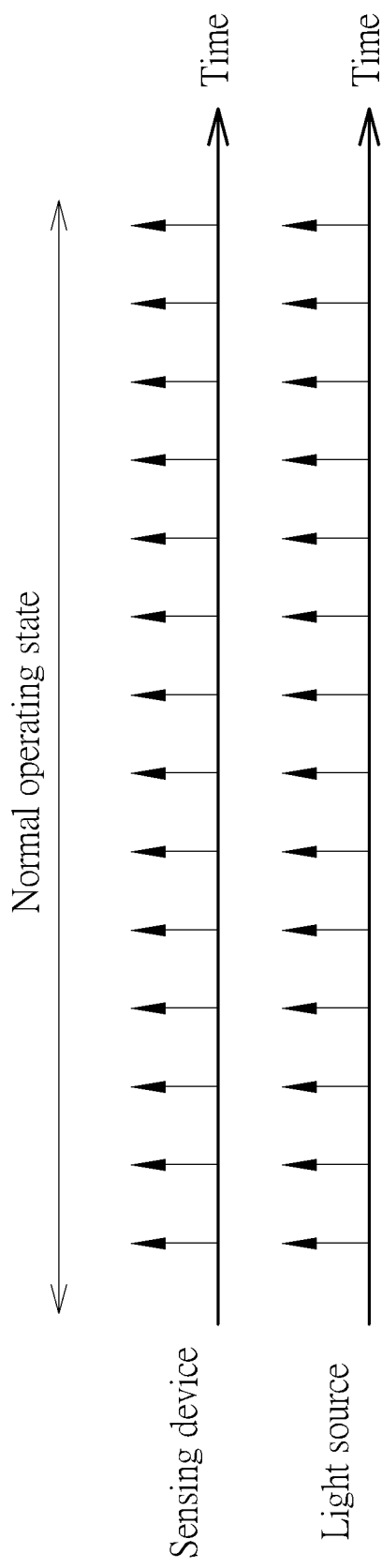
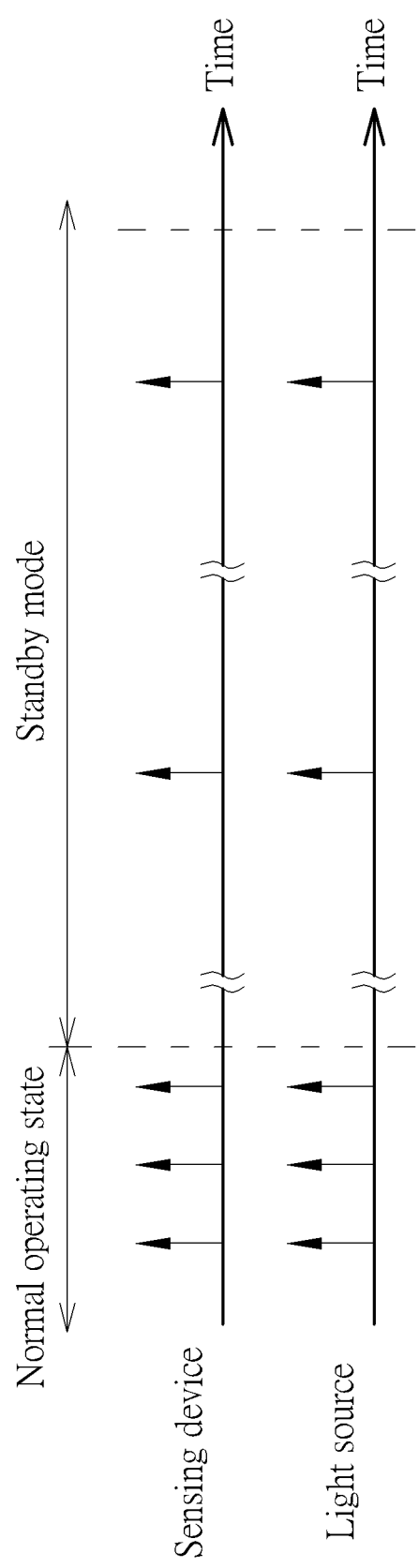
FIG. 2A PRIOR ART
FIG. 2B PRIOR ART

SENSOR ARRAY AND METHOD OF CONTROLLING SENSING DEVICE AND RELATED ELECTRONIC DEVICE

CROSS REFERENCE TO RELATED APPLICATIONS

The present application is a continuation application of U.S. application Ser. No. 16/593,930, filed on Oct. 4, 2019, which is further a continuation application of U.S. application Ser. No. 14/055,894, filed on Oct. 17, 2013, the contents of which are incorporated herein by reference.

BACKGROUND OF THE INVENTION

1. Field of the Invention

The present invention relates to video detection, and more particularly, to a method that is able to reduce power consumption of a gesture sensor, and a related electronic device and sensor array.

2. Description of the Prior Art

A sensing device of recognizing gesture (i.e., gesture sensor) is widely used in a variety of applications, providing an innovative and instinctive way of interacting human with machine, which detects motion of a hand of a user and accordingly issues control commands to a user interface. Generally, the sensing device of recognizing the gesture includes components as shown in FIG. 1. An active light source 110 periodically illuminates the hand and a sensing device 120 periodically detects changes of lights and shadows generated by illumination on the hand. Computation circuit inside the sensing device 120 determines whether the motion of the hand matches specific gesture patterns and accordingly generates control commands. Operating frequencies of the active light source 110 and the sensing device 120 are illustrated in FIG. 2A. When the hand leaves from a sensing covering range V of the sensing system 100, the active light source 110 and the sensing device 120 stop periodically operating. Then, a standby mode is entered such that power consumption can be saved. In the meantime, the active light source temporarily stops illuminating the hand of the user. Also, the sensing device 120 temporarily stops sampling changes of lights and shadows. In order to re-activate the sensing system 100 when the hands enter the sensing covering range again, the active light source 110 and the sensing device 120 intermittently detect whether the hand enter the sensing covering range V again (at a operating frequency which is lower than a operating frequency of the normal operating state). Once there is no change found between the lights and the shadows, the sensing system 100 remains in the standby mode. Otherwise, the sensing system 100 comes back to the normal operating state, performing gesture recognition. Operating frequencies regarding the active light source 110 and the sensing device 120 is illustrated in FIG. 2B.

However, as the active light source 110 and the sensing device 120 intermittently detects changes of the lights and the shadows, re-activation of the sensing system 100 may be delayed if the sensing device 120 cannot capture the motion of the hand immediately (i.e., the hand moves too fast). This is because the sensing system 100 is operated at a relatively low frequency under the standby mode and may miss the motion of the hand. As a result, the user feels delay when trying to re-activate the sensing system from the standby mode.

SUMMARY OF THE INVENTION

With this in mind, it is one objective of the present invention to provide detection and re-activation mechanism of a gesture senor under a standby mode, which utilizes an auxiliary sensing device to continually detects the hand instead of intermittently activating the gesture sensor to detect the hand. Therefore, the motion of the hand will not be missed and the gesture sensor can enter the normal operating state once the user tries to do so. Embodiments of the present invention provide a variety of ways for implementing the auxiliary sensing device, all of which cost less power than intermittently activating the gesture sensor.

According to one embodiment, an electronic device is provided. The electronic device comprises a first sensing device, a second sensing device, a light emitting device and a control unit. The first sensing device is utilized for selectively detecting a state of motion of an object at a first frequency. The second sensing device is utilized for selectively detecting the object to determine whether the object is in a specific space at a second frequency, wherein the second frequency is different from the first frequency. The light emitting device is utilized for illuminating the object to make the first sensing device able to detect the state of motion of the object. The control unit is coupled to the first sensing device and the second sensing device and utilized for controlling operating states of the first sensing device and the second sensing device.

According to one embodiment, a sensor array is provided. The sensor array comprises: a plurality of first sensing units and at least one second sensing unit. The plurality of first sensing units is utilized for selectively detecting a state of motion of an object at a first frequency. The at least one second sensing unit is utilized for selectively detecting the object to determine whether the object is in a specific space at a second frequency, wherein the second frequency is different from the first frequency; wherein the plurality of first sensing units and the at least one second sensing unit are disposed on a same plane and in a same chip.

According to one embodiment, a method of controlling sensing devices is provided. The method of controlling sensing devices comprises: utilizing a first sensing device to selectively detect a state of motion of an object at a first frequency; utilizing a second sensing device to selectively detect the object to determine whether the object is in a specific space at a second frequency, wherein the second frequency is different from the first frequency; and controlling operating states of the first sensing device and the second sensing device; wherein the first sensing device and the second sensing device are disposed on a same plane and in a same chip.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2A and 2B illustrate a diagram of operating frequencies of components of the conventional sensing system in a normal operating state and a standby mode.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
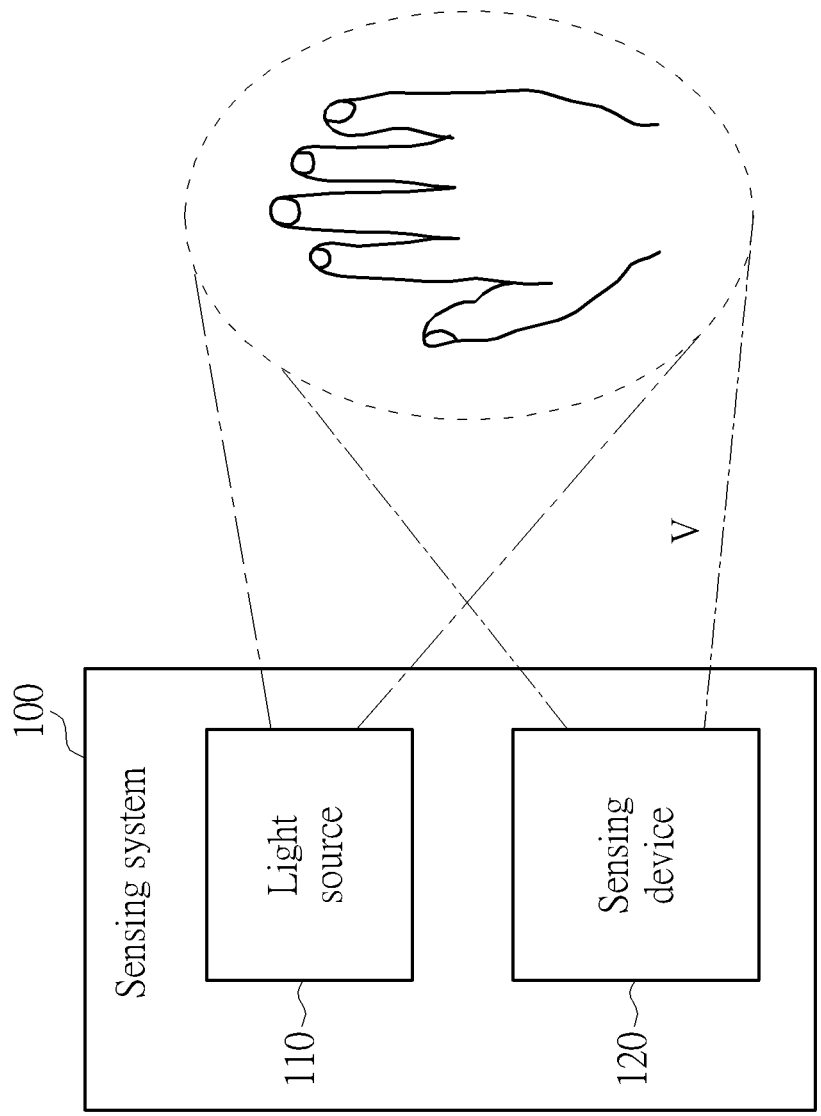
FIG. 1 illustrates a representation of a conventional sensing system.
Figure 3:
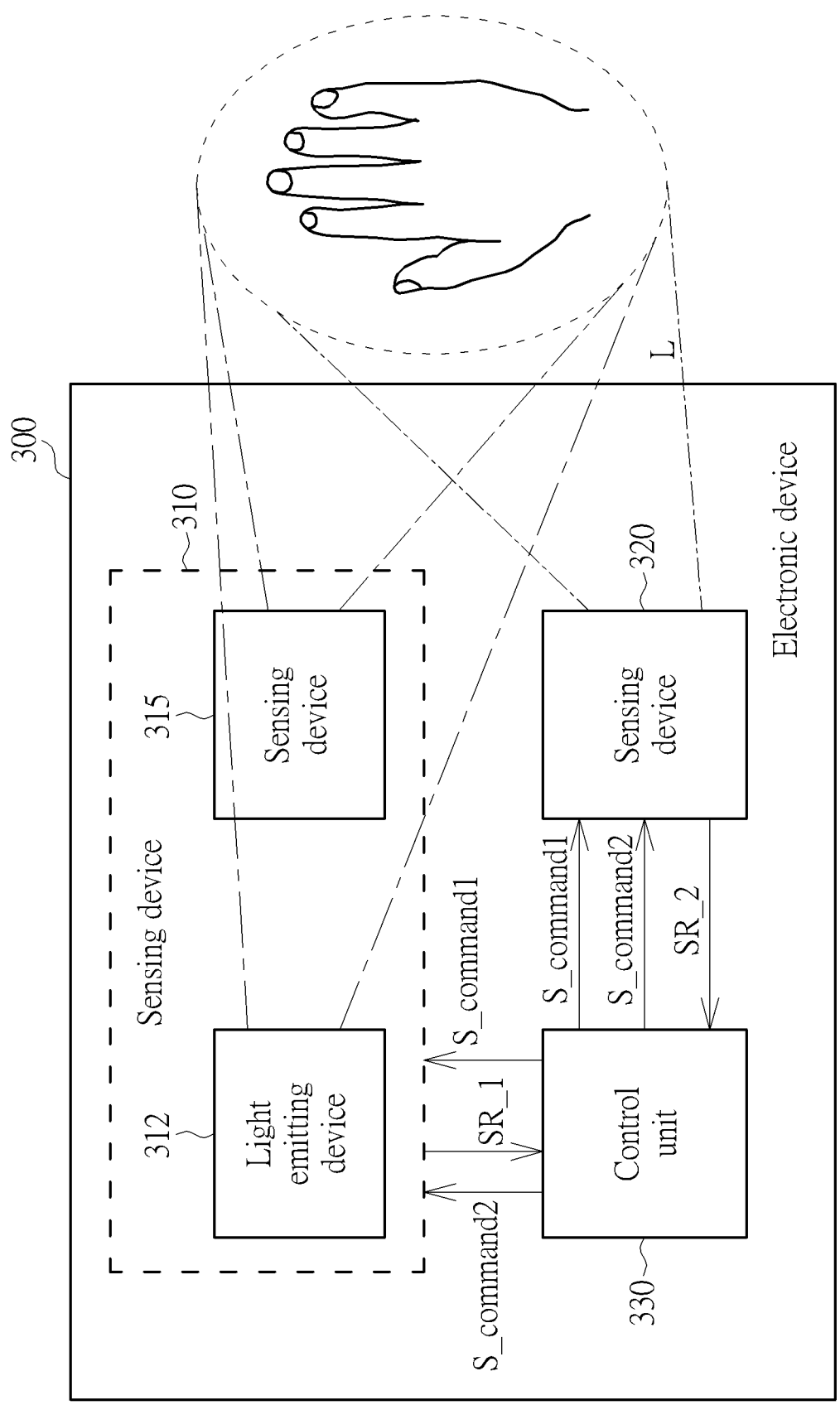
FIG. 3 illustrates a representation of an electronic device according to one embodiment of the present invention.

Please refer to FIG. 3, which is a representation of an electronic device according to one embodiment of the present invention. As shown, an electronic device 300 comprises a sensing system 310, a sensing device 320 and a control unit 330. The sensing system 310 could be a gesture sensor, which further includes a sensing device 315. The sensing device 315 is arranged for selectively detecting an object (e.g. a hand) to generate a detection result SR_1. The detection result SR_1 indicates a state of motion of the object. The sensing device 315 comprises a sensor array as well as related computation and/or control circuits. The sensing device 320 is arranged for selectively detecting the object to generate a detection result SR_2. The detection result SR_2 is able to indicate whether the object is in a specific space L (i.e., a sensing covering range of the sensing system 310). The control unit 330 is coupled to the sensing device 315 and the sensing device 320, and is arranged for controlling operating states of the sensing device 315 and the sensing device 320 according to the detection results SR_1 and SR_2.

By the detection result SR_1 and the detection result SR_2, the activation or operating states of the sensing device 315 and the sensing device 320 can be determined. When the detection result SR_1 indicates that the object leaves from the specific space L or the object is motionless, the control unit 330 issues the control command S_command1 to the sensing device 315, allowing the sensing device 315 to enter a low power consumption operating state or stop operating. At this time, the sensing device 315 temporarily stops generating the detection result SR_1 to save power consumption. More specifically, the present invention analyzes several detection results SR_1 sampled during a period of time. Once it is found that there is no obvious difference between these detection results SR_1 (i.e. the object is motionless) or the object leaves from the specific space L (i.e. the detection result SR_1 indicates a sudden change occurs and then remains unchanged), the control unit 330 will send the control command S_command1 to the sensing system 310. By turning off/lowering down power that is supplied to a readout circuit, a selecting circuit, a reset circuit or other circuit components of the sensing device 315, and/or turning off a light emitting device 312 of the sensing system 310, the power consumption can be reduce. The light emitting device 312 is used to illuminate the object such that the sensing device 315 is able to detect the state of motion of the object according to changes of lights and shadows. At the same time, the control command S_command1 issued by the control unit 330 will be also sent to the sensing device 320, allowing the sensing device 320 to enter a normal operating state, generating the detection result SR_2. Afterward, the control unit 330 determines whether to re-activate the sensing device 315 and turn on the light emitting device 312 according to the detection result SR_2. Therefore, it can be determined whether to allow the sensing system 310 to enter the normal operating state.

Compared to the conventional art, the sensing device 315 of the present invention does not intermittently activate to detect the state of motion of the object when it enters the low power consumption operating state. Instead, the auxiliary sensing device 320 of simple circuitry and low consumption is used to detect the state of motion of the object. In one embodiment, the sensing device 320 could be an ambient light sensor or a proximity sensor. Such device cost much less power than the sensing device 315 comprised of a lot of sensing units. Although the sensing device 320 cannot recognize the gesture of the hand but it can detect whether the object (e.g. the hand) is in the specific space L. Since the specific space L represents the sensing covering range of the sensing system 310, it is unnecessary to re-activate the sensing device 315 and allow the sensing device 315 to enter the normal operating state if the object is not in the specific space L. Only when the object is in the specific space L, the sensing device 315 needs to be activated.

Figure 4:
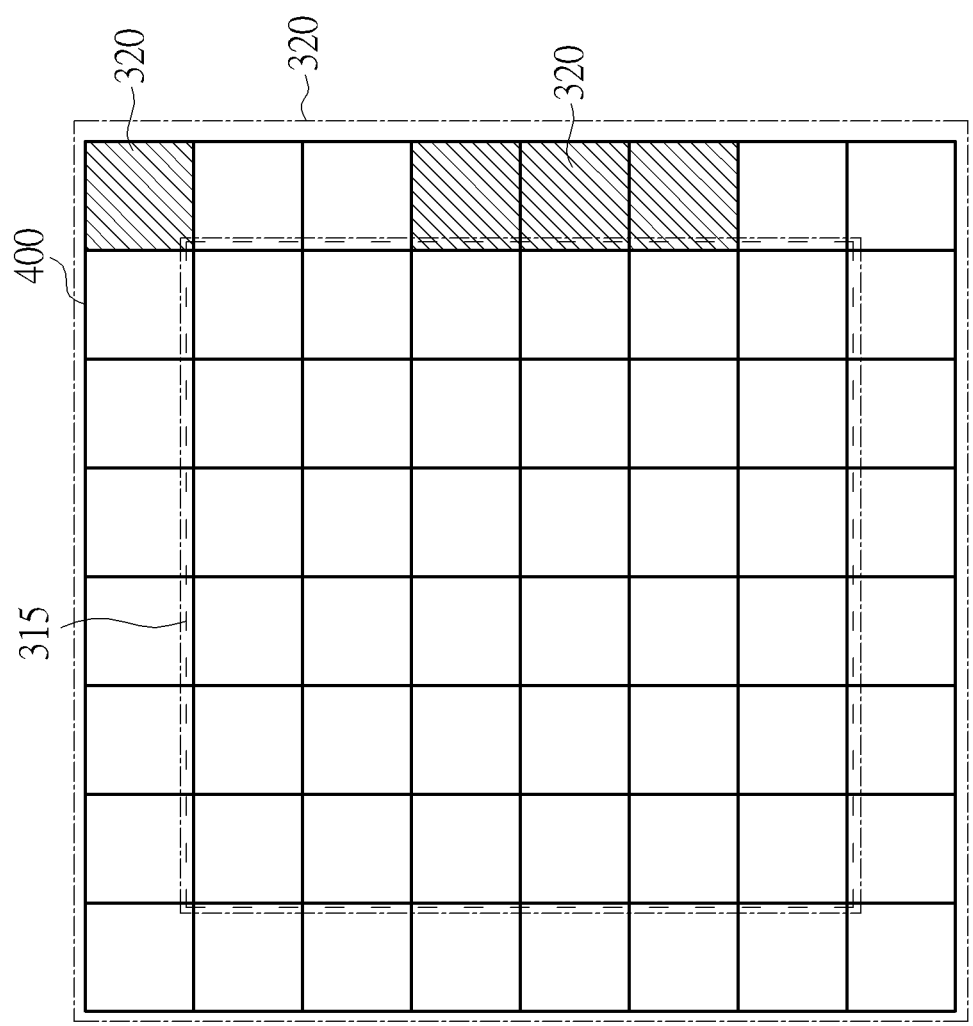
FIG. 4 illustrates a representation of a sensor array according to one embodiment of the present invention.

In addition to the ambient light sensor or the proximity sensor, it still has other different ways to realize the sensing device 320. In one embodiment, the sensing device 320 and the sensing device 315 could be portions of a sensor array, respectively. Please refer to FIG. 4. A center portion of sensing units of a sensor array 400 is arranged as the sensing device 315, which detects the state of motion of the object according to the changes of the shadows and the lights. The other portion of the sensing units of the sensor array 400 is arranged as sensing device 320, which detects whether the object is in the specific space L. Please note that the present invention is not limited in scope to the arrangement illustrated in FIG. 4. For example, the sensing device 320 could be one or more sensing units in any position of the sensor array (e.g. edge, corner or center). As the number of the sensing units that are arranged as the sensing device 320 is smaller than the number of the sensing units that are arranged as the sensing device 315, the power cost by the sensing device 320 is much less than the intermittently activating the sensing device 315 to detect the state of motion of the object. Moreover, no matter the sensing device 320 is realized by the ambient light sensor and the proximity sensor or is realized by some of sensing units of the sensor array, the sensing system 310 and the sensing device 320 can be implemented with in a single chip (i.e., System on Chip, SoC), thereby saving the size of the circuit.

Figure 5:
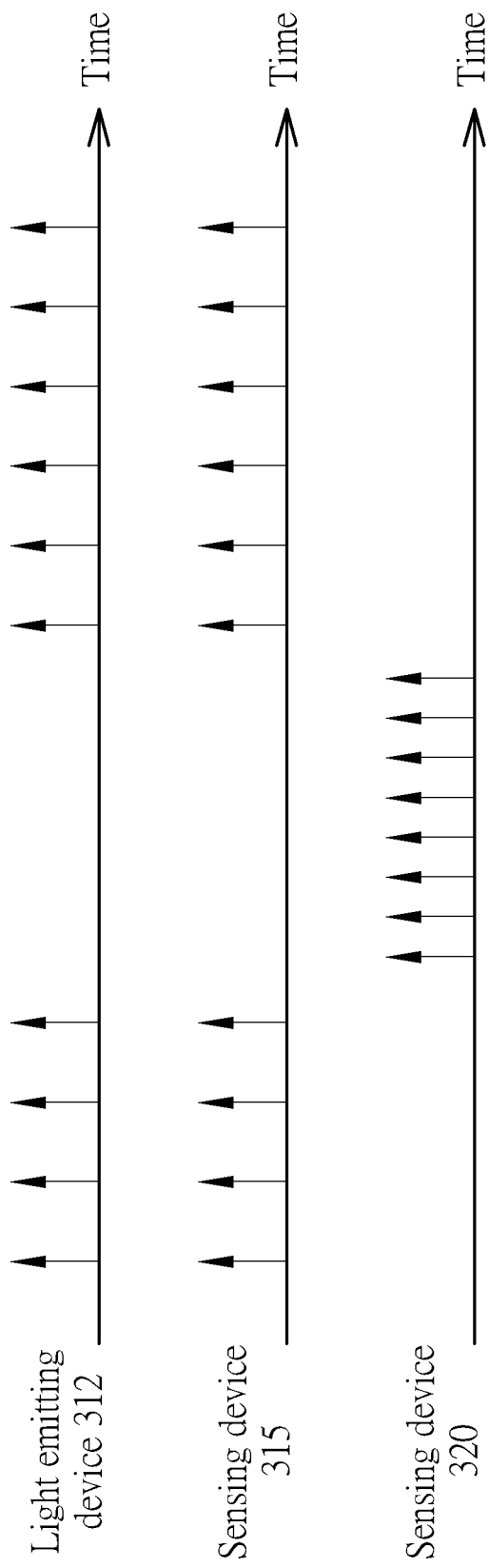
FIG. 5 illustrates a diagram of operating frequencies of components of the electronic device in a normal operating state and a low power consumption operating state.

When the detection result SR_2 generated by the sensing device 320 indicates that the object enters the specific space L again or the object begins to move, the control unit 330 issues the control command S_Command2, allowing the sensing system. 310 to enter a normal operating state, detecting the state of motion of the object to generate the detection result SR_1. Similarly, the control command S_Command2 will be also issued to the sensing device 320, ending the operation of the sensing device 320. Operating frequencies of the sensing system 310 and the sensing device 320 can be understood by FIG. 5.

Figure 6:
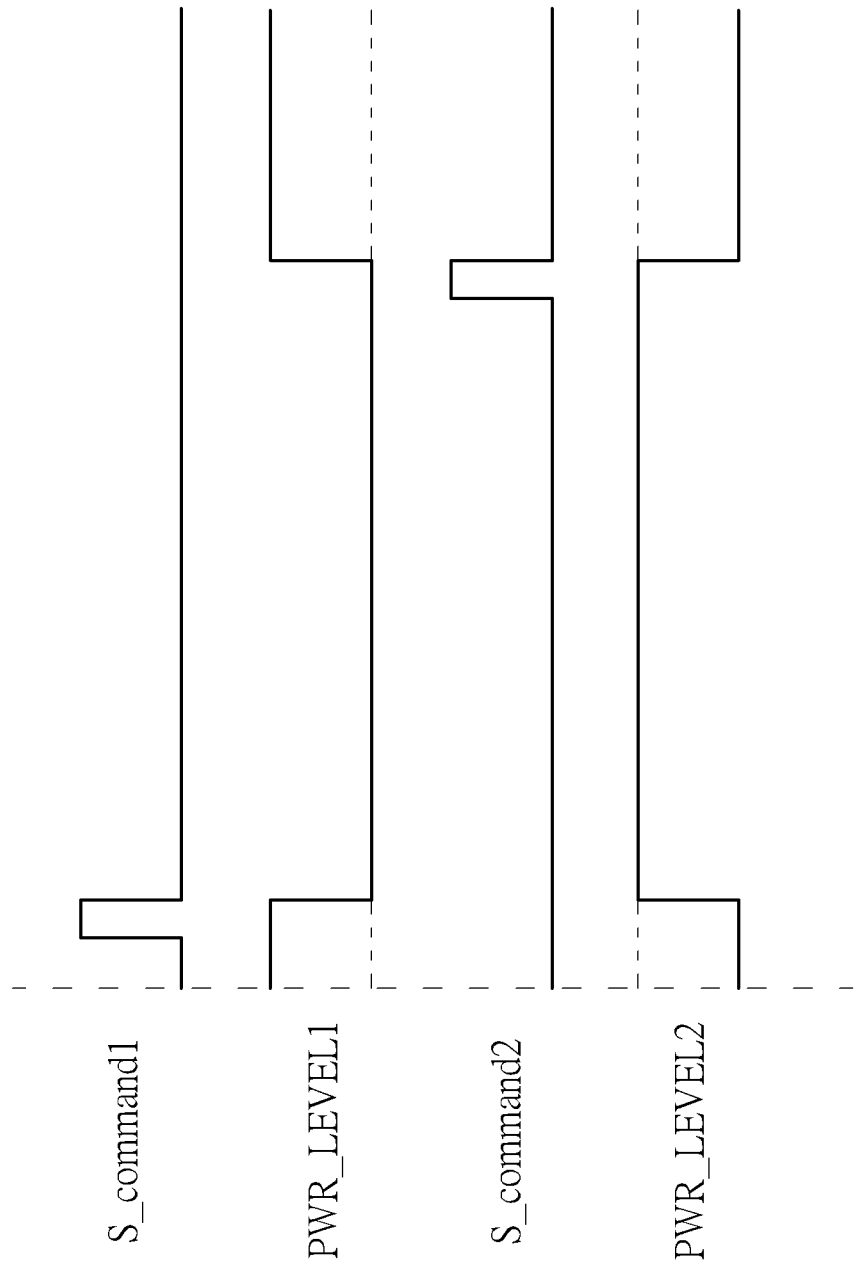
FIG. 6 illustrates a diagram of relationship between the timing of a control command and power consumption level of operating frequencies of components of the electronic device in a normal operating state and a low power consumption operating state components of the electronic device.

Please refer to FIG. 6, which illustrates the relationship between power consumption level and the control command. When the object leaves from the specific space L or is motionless, the control command S_Command1 is issued, causing the power consumption level PWR_Level1 of sensing system 310 to be reduced (by allowing the sensing device 315 to enter the low power consumption operating state or to be de-activated, and turning off the light emitting 312), thereby stopping detecting the object. As a consequence, the sensing device 320 is activated, entering the normal operating state such that the power consumption level PWR_Level2 is increased. Once the sensing device 320 indicates the lights and shadows in the specific space L changes (i.e., the object enters the sensing covering range again or the object begins to move), the control command S_Command2 is issued, allowing the sensing system 310 to enter the normal operating state. At this time, the power consumption level PWR_Level1 of the sensing system 310 goes back to a normal value. Also, the sensing device 320 will be de-activated or enter the low power consumption operating state, causing the power consumption level PWR_Level2 to be reduced.

Figure 7:
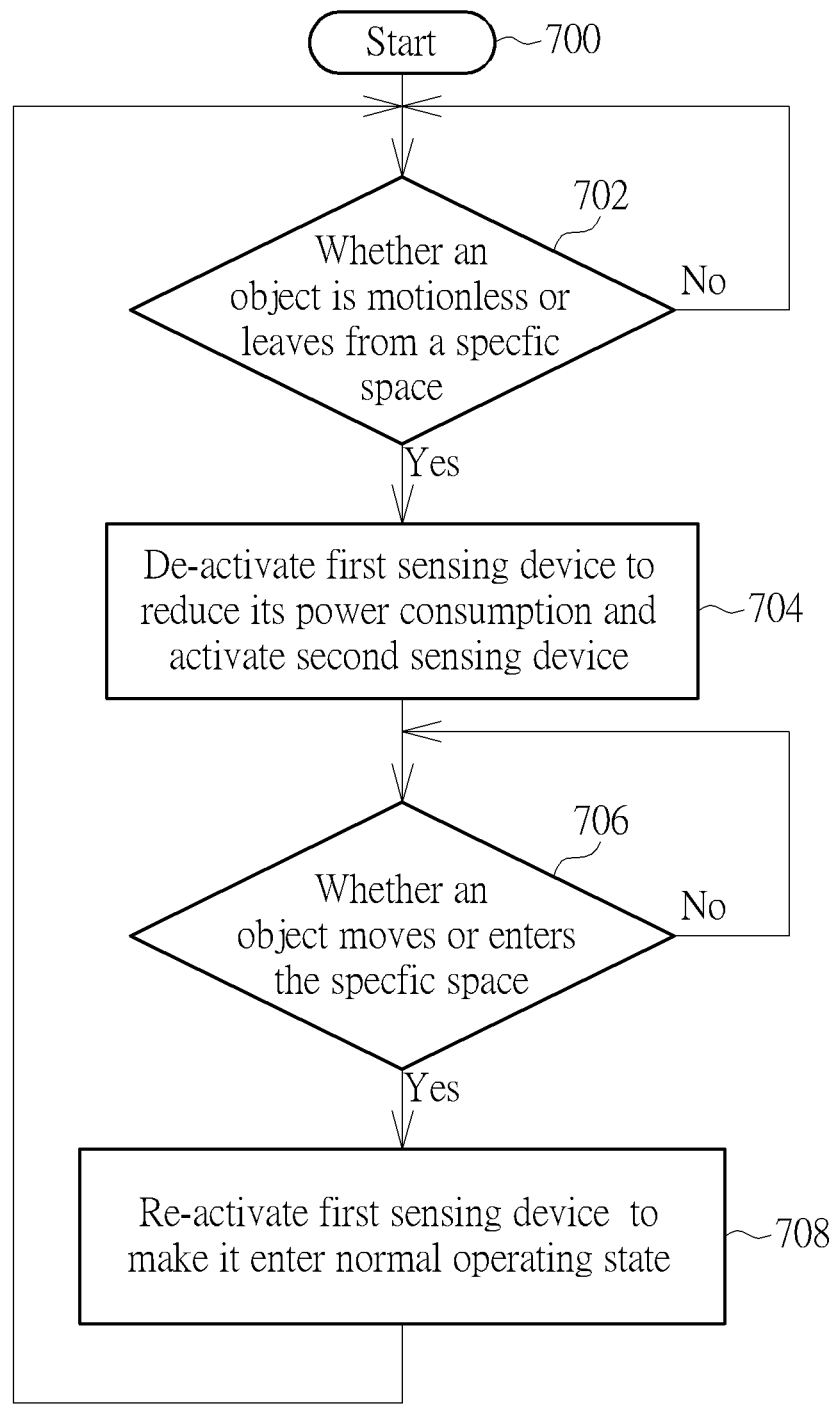
FIG. 7 illustrates a flow chart of a method of controlling sensing devices according to one embodiment of the present invention.

Based on the principles mentioned above, a method of controlling a sensing device is provided according to one embodiment of the present invention. The method includes steps as shown in FIG. 7. At step 700, the flow starts. At step 720, it is determined that whether an object leaves from a specific space L or is motionless. Such determination is accomplished by referring to a first detection result (e.g. the detection result SR_1) generated by a first sensing device (e.g. the sensing device 315). If it is determined that the object does not leave from the specific space or is not motionless, the flow goes back to step 702 to continue determining. If it is determined that the object leaves from the specific space or is motionless, the flow goes to step 704, de-activating the first sensing device or allowing the first sensing device to enter the low power consumption operating state. At the same time, alight emitting device corresponding to the first sensing device may be turned off. Also, a second sensing device (e.g. the sensing device 320) is activated to generate a second detection result (e.g. the second detection result SR_2). Afterward, the flow goes to step 706, it is determined that the object enters the specific space L again or begins to move. If no, the flow goes back to 706. If yes, the flow goes to step 708, de-activating the second sensing device and activating first sensing device to enter the normal operating state. Also, the light emitting device is turned on such that the first sensing device is able to detect the state of motion of the object.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, advantages of utilizing an auxiliary sensing device (i.e. sensing device 320) instead of intermittently activating the gesture sensor includes shorter re-activation time and less power consumption. This is because the auxiliary sensing device has simple circuitry and low power consumption. Even though the auxiliary sensing device is operated at a high frequency, the total power consumption is still decent. Besides, if the auxiliary sensing device is operated at the high frequency to detect, it will not miss the state of motion of the object easily such that the re-activated time can be shortened. As a result, the user will not feel the delay of the re-activation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a first sensing device for selectively detecting a state of motion of an object at a first frequency;
   a second sensing device for selectively detecting the object to determine whether the object is in a specific space at a second frequency, wherein the second frequency is greater than the first frequency; and the power consumption of the second sensing device is smaller than the power consumption of the first sensing device;
   a light emitting device, for illuminating the object to make the first sensing device able to detect the state of motion of the object; and
   a control unit, coupled to the first sensing device and the second sensing device, for controlling operating states of the first sensing device and the second sensing device;
   wherein the first sensing device and the second sensing device are discrete to each other; and the first sensing device and the second sensing device are incorporated into a single System-on-a-Chip (SoC); and when the object leaves from the specific space or the object is motionless, the control unit allows the first sensing device to enter a low power consumption operating state, and the first sensing device accordingly stops detecting.

2. The electronic device of claim 1, wherein when the object leaves from the specific space or the object is motionless, the control unit allows the second sensing device to enter a normal operating state, and the second sensing device accordingly starts to detect.

3. The electronic device of claim 1, wherein when the object enters the specific space or the object moves, the control unit allows the first sensing device to enter a normal operating state, and the first sensing device accordingly starts to detect.

4. The electronic device of claim 3, wherein before the control unit allows the first sensing device to enter the normal operating state, the first sensing device stops detecting.

5. The electronic device of claim 1, wherein the control unit turns on/off the light emitting device in response to detection results of the first sensing device and the second sensing device.

6. The electronic device of claim 1, wherein the first sensing device and the second sensing device are portions of a sensor array.

7. The electronic device of claim 1, wherein the first sensing device and the second sensing device are disposed in a same chip.

8. The electronic device of claim 1, wherein the second sensing device is an ambient light sensor or a proximity sensor.

9. A method of controlling sensing devices, comprising:
utilizing a first sensing device to selectively detect a state of motion of an object at a first frequency;
utilizing a second sensing device to selectively detect the object to determine whether the object is in a specific space at a second frequency, wherein the second frequency is greater than the first frequency; and the power consumption of the second sensing device is smaller than the power consumption of the first sensing device; and
controlling operating states of the first sensing device and the second sensing device, comprising:
when object leaves from the specific space or the object is motionless, allowing the first sensing device to enter a low power consumption operating state and to stop detecting;
wherein the first sensing device and the second sensing device are discrete to each other; and the first sensing device and the second sensing device are incorporated into a single System-on-a-Chip (SoC).

10. The method of claim 9, wherein the step of controlling the operating states of the first sensing device and the second sensing device comprises:
when the object leaves from the specific space or the object is motionless, allowing the second sensing device to enter a normal operating state and start to detect.

11. The method of claim 9, wherein the step of controlling the operating states of the first sensing device and the second sensing device comprises:
when the object enters the specific space or the object moves, allowing the first sensing device to enter a normal operating state and start to detect.

12. The method of claim 11, wherein the step of controlling the operating states of the first sensing device and the second sensing device comprises:
allowing the first sensing device to stop detecting before the first sensing device entering the normal operating state.

* * * * *